US010856043B2

United States Patent
Cummins et al.

(10) Patent No.: US 10,856,043 B2
(45) Date of Patent: Dec. 1, 2020

(54) SIMULTANEOUS MOTION OF USERS TO TRIGGER ESTABLISHMENT OF NETWORK COMMUNICATIONS CHANNEL

(71) Applicants: Patrick Dean Cummins, Louisville, KY (US); Adam Ryan Moller, Louisville, KY (US)

(72) Inventors: Patrick Dean Cummins, Louisville, KY (US); Adam Ryan Moller, Louisville, KY (US)

( * ) Notice: Subject to any disclaimer, the term of this patent is extended or adjusted under 35 U.S.C. 154(b) by 0 days.

(21) Appl. No.: 16/517,717

(22) Filed: Jul. 22, 2019

(65) Prior Publication Data
US 2020/0053316 A1 Feb. 13, 2020

Related U.S. Application Data

(63) Continuation of application No. 15/687,446, filed on Aug. 26, 2017, now Pat. No. 10,405,038.
(Continued)

(51) Int. Cl.
*H04N 21/442* (2011.01)
*H04N 7/14* (2006.01)
(Continued)

(52) U.S. Cl.
CPC ....... *H04N 21/44218* (2013.01); *G06F 3/011* (2013.01); *H04L 12/1818* (2013.01); *H04L 12/1822* (2013.01); *H04N 7/144* (2013.01); *H04N 7/147* (2013.01); *H04N 7/152* (2013.01); *H04N 21/42202* (2013.01); *H04N 21/42203* (2013.01); *H04N 21/458* (2013.01); *H04N 21/4524* (2013.01); *H04N 21/4788* (2013.01)

(58) Field of Classification Search
CPC .................. H04N 21/44218; H04N 7/14–157
See application file for complete search history.

(56) References Cited

U.S. PATENT DOCUMENTS 9,066,115 B1 * 6/2015 Cherry ................. H04N 21/812
2002/0163572 A1 * 11/2002 Center, Jr. ....... H04N 21/44218
348/14.08
(Continued)

FOREIGN PATENT DOCUMENTS

WO WO-2010072075 A1 * 7/2010 ............. H04N 7/147

*Primary Examiner* — Robert J Hance
(74) *Attorney, Agent, or Firm* — Cummins IP Law PLLC; Patrick Dean Cummins

(57) ABSTRACT

Disclosed are systems, methods, and apparatus for communicating hardware generated video between two or more devices. The devices can operate to mimic chance interactions, or "stop-and-chats," that normally occur when two or more persons are living together or otherwise in the same locations. For example, each computer or circuit can determine whether a person is proximate to the computer. If two persons that designate each other as connections are simultaneously proximate to their respective devices, a video hardware connection will be created between their computers. Furthermore, respective circuitry can be connected to a third device associated with a person who is proximate to their respective device and also indicated as a connection by both of the two persons who are already connected. A video hardware connection can disconnect when one person participating in the video is no longer proximate to their respective device.

20 Claims, 10 Drawing Sheets

Related U.S. Application Data

(60) Provisional application No. 62/381,561, filed on Aug. 30, 2016.

(51) Int. Cl.
*H04N 21/422* (2011.01)
*H04N 21/458* (2011.01)
*H04N 21/4788* (2011.01)
*H04N 21/45* (2011.01)
*G06F 3/01* (2006.01)
*H04L 12/18* (2006.01)
*H04N 7/15* (2006.01)

(56) References Cited

U.S. PATENT DOCUMENTS

| | | | | |
|---|---|---|---|---|
| 2006/0259755 A1* | 11/2006 | Kenoyer | ................ | G06F 21/32 713/1 |
| 2008/0167005 A1* | 7/2008 | Gilzean | ............ | H04M 1/72522 455/412.2 |
| 2009/0309955 A1* | 12/2009 | Gladstone | ......... | H04M 3/42374 348/14.04 |
| 2011/0109715 A1* | 5/2011 | Jing | ................... | H04N 7/17318 348/14.08 |
| 2011/0141220 A1* | 6/2011 | Miura | .............. | H04N 21/41407 348/14.02 |
| 2011/0239117 A1* | 9/2011 | Sutton | ................... | G06F 3/0486 715/706 |
| 2013/0031582 A1* | 1/2013 | Tinsman | ............ | H04N 21/4316 725/36 |
| 2014/0375752 A1* | 12/2014 | Shoemake | ....... | H04N 21/44218 348/14.07 |
| 2015/0163262 A1* | 6/2015 | Bank | .................... | H04L 65/1069 709/204 |
| 2016/0182973 A1* | 6/2016 | Winograd | .......... | H04N 21/8586 725/25 |
| 2017/0099353 A1* | 4/2017 | Arora | ...................... | H04L 67/22 |
| 2018/0032997 A1* | 2/2018 | Gordon | ............. | G06Q 30/0269 |

* cited by examiner

SIMULTANEOUS MOTION OF USERS TO TRIGGER ESTABLISHMENT OF NETWORK COMMUNICATIONS CHANNEL

FIELD OF THE DISCLOSURE

The present disclosure relates generally to systems, methods, and apparatus for providing a network from video hardware availability. Specifically, the embodiments discussed herein relate to automatically establishing networks based on one or more video hardware connections.

BACKGROUND

Networking device hardware can be time consuming depending on the availability of users and the types of device hardware. Oftentimes, users may avoid real-time telephone communications because attempts at establishing such communications may not always result in a connection. For example, placing a phone call to a person who is not available may not result in a channel of communication between two persons. Therefore, the time and energy spent placing the phone call would be wasted.

SUMMARY

The present disclosure provides systems, methods, and apparatus for mimicking interpersonal communications between multiple persons. In some embodiments, an apparatus is set forth. The apparatus can include: a network interface configured to receive video data from a computer over a network connection between the computer and the network interface. The apparatus can also include a first sensor configured to provide a sensor signal based on a first environmental change affecting the first sensor. Additionally, the apparatus can include a processor connected to the first sensor and the network interface, the processor can be configured to: cause the network interface to connect with the computer over the network connection when (i) the first environmental change is affecting the first sensor, and/or (ii) a second environmental change is simultaneously affecting a second sensor that is connected to the computer.

In some embodiments, the first sensor is a motion detecting sensor (e.g., a camera) and the first environmental change is associated with a movement of a user relative to the first sensor. The processor can be further configured to identify image data corresponding to physical traits of a user, the image data being based on the sensor signal from the first sensor. The processor can be further configured to cause the network interface to connect with the computer over the network connection after the processor identifies the physical traits of the user.

The apparatus can also include a display panel and the processor can be configured to cause the display panel to enter a wake state from a sleep state when: (i) the first environmental change is affecting the first sensor, and/or (ii) a second environmental change is simultaneously affecting a second sensor that is connected to the computer. The processor can be further configured to receive an indication that the computer is requesting permission to connect a second computer to the network interface, and cause the network interface to simultaneously connect with the computer and the second computer. The processor can be configured to create a voice message in the memory using a microphone signal from a microphone of the apparatus, and cause the network interface to transmit the voice message to the computer when a third environmental change is simultaneously affecting the second sensor that is connected to the computer.

In other embodiments, a non-transitory computer-readable medium is set forth. The non-transitory computer-readable medium can store instructions that when executed by one or more processors of a first computing device, cause the first computing device to perform steps that include: determining, using on a sensor signal from a sensor of the first computing device, that a first user is proximate to the first computing device. The steps can also include receiving, at a network interface of the first computing device, an indication that a second user is proximate to a second computing device that is in communication with the first computing device. Additionally, the steps can include causing a display device of the first computing device to transition from a sleep mode to an on mode, and causing a video communications channel to be created for sharing video data between the first computing device and the second computing device.

In some embodiments, the steps can further include receiving schedule data, wherein the schedule data defines a period of time when the video data can be shared over the video communications channel. The steps can also include, when the computing device is not operating in the period of time and in response to the first user becoming proximate to the computing device, receiving a video message from the second computing device. The steps can also include determining, using the sensor signal from the sensor, whether the user is located at a first side of the display device or a second side of the display device, wherein the first side is opposite the second side and the display device is an at least partially transparent display panel. The steps can also include causing image frames to be displayed at the display device according to whether the user is located at the first side of the display device or the second side of the display device.

In yet other embodiments a method is set forth for connecting a first computing device to a second computing device through a network connection when motions are simultaneously detected by the first computing device and the second computing device. The method can be performed by the first computing device and include a step of connecting to a video communications channel between the first computing device and the second computing device when each of a first sensor of the first computing device and a second sensor of the second computing device simultaneously detect an environmental change occurring at each of the first sensor and the second sensor, respectively. In some embodiments, the first sensor is a video camera and the environmental change is motion that occurs in a field of view where the video camera is facing. The method can also include steps of: storing an editable contact list that is configured to include entries that identify the second computing device and a third computing device; receiving an indication that a third sensor of the third computing device has detected an environmental change; and creating a video communications channel between the first computing device and the third computing device, wherein the first computing device simultaneously shares video data with the second computing device and the third computing device. The method can also include a step of receiving a request to add an entry to a contact list stored by the first computing device, the entry corresponding to a contact name stored by the second computing device. In some embodiment, the first computing device can include a wireless transmitter for connecting to an auxiliary device associated with a user of the first computing device, and the method steps can further include: increasing a sampling rate of the first sensor in response to the auxiliary device connecting to the wireless transmitter. In some embodiment, the first computing device can include a wireless transmitter for connecting to a wireless network, and the method steps can further include: increasing a sampling rate of the first sensor when an auxiliary device, associated with a user of the first computing device, is connected to the wireless network. In some embodiments, the first computing device can include a wireless transmitter for connecting to a wireless network, and the method steps can further include: increasing a sampling rate of the first sensor when an auxiliary device, associated with a user of the first computing device, is connected to the wireless network. In some embodiments, the first computing device can include an at least partially transparent display panel, and the steps further include: decreasing a transparency of the display panel when video data is transmitted over the video communications channel. In some embodiments, the first computing device can include an at least partially transparent display panel such that light can at least partially traverse a width of the first computing device, and the method steps can further include: modifying an orientation of video data displayed at the at least partially transparent display panel according to a perceived location of the first user relative to the at least partially transparent display panel.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
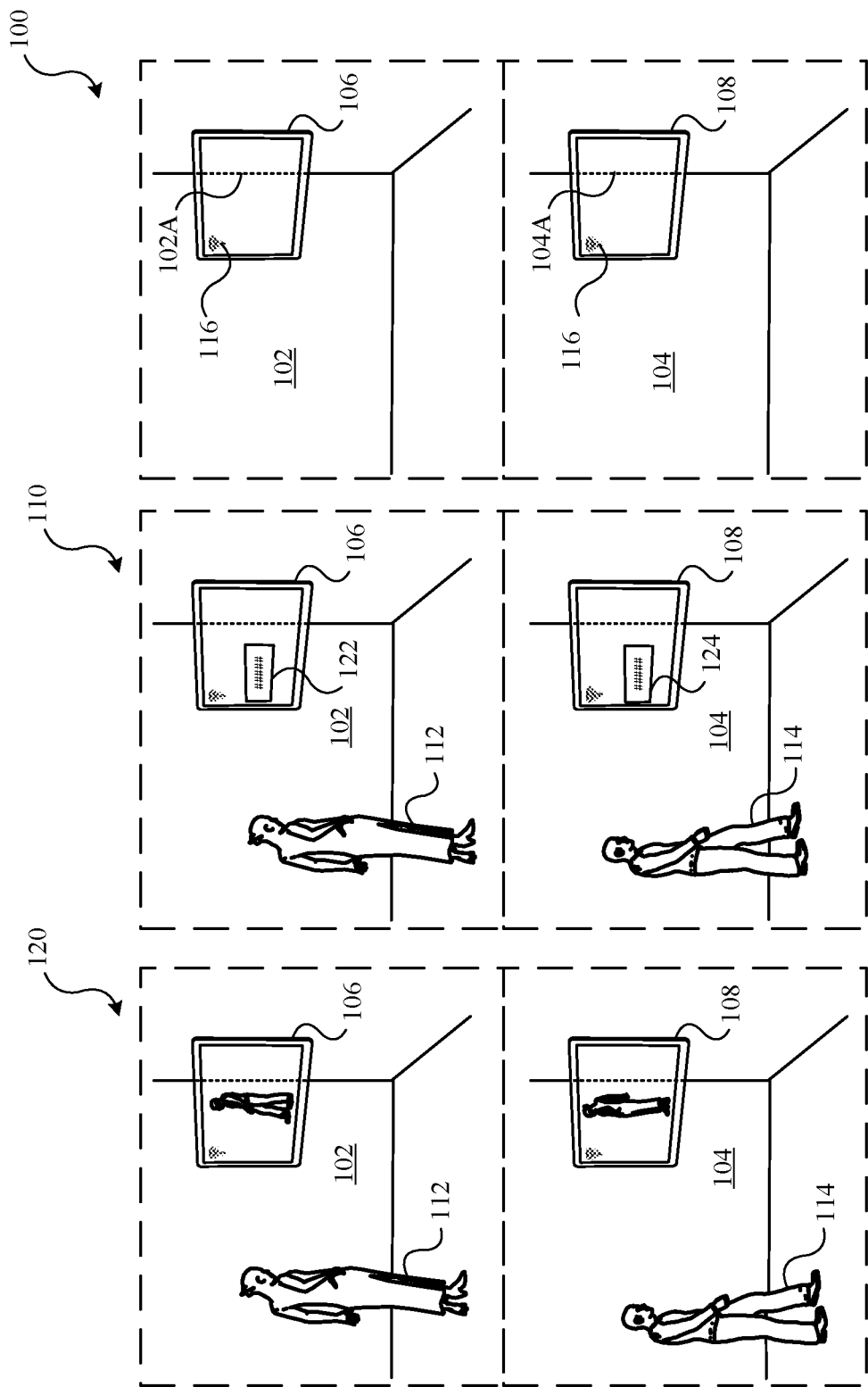
FIG. 1 illustrates steps for initiating a chat session between a first user and a second user, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Many mobile devices include calling features for conducting audio calls with another person. Typically the calling features require that a person open an application for initiating an audio call, identify the contact who is to be called, then confirm that the call is to be initiated. Interpersonal communications are very different because there are no steps that require a person to first open an application and choose a contact to talk to. Rather, many interpersonal communications come about when two persons become proximate to one another and at least one of the persons initiates a conversation. The systems, methods, and apparatus described herein are set forth as ways for mimicking interpersonal interactions using computing devices, as well as building social networks using such computing devices.

The computing devices can include a network interface for connecting to other affiliated computing devices over one or more network connections, as well as a video camera for collecting video data that can be sent over the network connections to the affiliated computing devices. The video camera, or other sensors on the computing device, can be used to collect data for performing motion detection, facial recognition, voice recognition, or any other suitable person-identification or biometric algorithm. When the computing device detects that a user is proximate to the computing device, or otherwise available for participating in a video chat session with an affiliated computing device, the computing device can send an indication to the affiliated computing device. The indication will notify the affiliated computing device that the user is available for participation in a video chat session.

Each computing device can store a list of contacts that include at least one entry that identifies a user associated with an affiliated computing device. The affiliated computing device is therefore "affiliated" with the computing device based at least on the inclusion of the entry in the contact list. The affiliated computing device can also include one or more sensors (e.g., microphone, camera, touch sensor, heat sensor, and/or antenna for detecting auxiliary devices on a user's person) for detecting motion and/or collecting data for performing personal-identification or biometric algorithms. The affiliated computing device can also include a contact list that includes an entry that identifies a user associated with another computing device.

A video communications channel between computing devices can be initiated when two or more users that identify each other in their contact list are simultaneously present near their respective computing device. For example, a first computing device operated by a first user can include a first contact list that identifies a second user. The second user can operate a second computing device that includes a second contact list having an entry that identifies the first user. When a first computing device determines that a first user is proximate to the first computing device, the first computing device can send a first indication to a second computing device. The first indication notifies the second computing device that the first user is proximate to the first computing device. If the second computing device determines that a second user is proximate to the second computing device, the second computing device can send a second indication to the first computing device. The second indication notifies the first computing device that the second user is proximate to the first computing device. Thereafter, a video communications channel can be created between the first computing device and the second computing device. The video communications channel allows for a video session between the first user and the second user. During the video session, a microphone, a video camera, and a display panel of each of the first computing device and the second device will allow the first user and the second user to communicate with each other.

In some embodiments, the computing device can perform facial recognition in order to identify the user that is proximate to the computing device. Facial recognition can be performed by identifying facial features in image data derived from the video camera of the computing device and comparing the facial features to facial recognition data and/or perceived data stored by the computing device. By distinguishing between different users, the computing device is able to operate differently according to which user is proximate to the computing device. For example, the computing device can store a different contact list for each user. Furthermore, the computing device can operate according to different schedules that are associated with different users. Furthermore, the computing device can use different privacy setting depending on which user is detected by the computing device.

In some embodiments, the computing device can perform voice recognition in order to identify the user that is proximate to the computing device. Voice recognition can be performed by identifying one or more vocalizations in audio data derived from a microphone of the computing device and comparing the vocalizations to voice recognition data stored by the computing device. Vocalizations can include frequency signatures, amplitude variations, speed, accent, pronunciation, articulation, roughness, nasality, tone, and/or pitch. By distinguishing between different users, the computing device is able to operate differently according to which user is speaking near the computing device. For example, the computing device can store a different contact list for each user. When a particular user is talking near the computing device, that particular user's contact list can be used for creating a video communications channel with another computing device associated with another user on the particular user's contact list. Furthermore, the computing device can operate according to different schedules that are associated with different users. Therefore, when a particular user is talking near the computing device, that particular user's schedule can be used to determine whether that particular has granted permission to create a video communications channel during the present or a future time period.

In some embodiments, the computing device can recognize an auxiliary device as a way of recognizing the presence of a user. For example, the computing device can include a near-field receiver (e.g., Bluetooth receiver) for connecting with an auxiliary device such as a cellular phone, or otherwise receiving a signal from the auxiliary device. The computing device can also store data that correlates the cellular phone with a particular user. In this way, when the computing device detects the presence of the cellular phone via the near-field receiver, the computing device can operate according to certain preferences of that particular user. Similarly, in some embodiments, the computing device can include a WiFi receiver for connecting to a WiFi network. When the computing device and an auxiliary device associated with a particular user are connected to the same WiFi network, the computing device can operate according to certain preferences associated with that particular user.

In some embodiments, the computing device can be connected to a home WiFi network for use by the residents in the home and used by guests of the home. A guest that has not previously used the computing device in the home can enter the home and be detected by the computing device according to any of the methods discussed herein. If the guest also has a similar computing device that mimics interpersonal interactions (such as those discussed herein), the computing device in the user's home can recognize the guest and download the contact list of the guest. Thereafter, if a contact on the contact list of the guest is indicated as being proximate to the contact's respective computing device, a video communications channel can be created between the user's computing device and the contact's computing device. The video communications channel can be created when the guest is proximate to the user's computing device simultaneous to the contact being proximate to the contact's computing device. It should be noted that a user can be proximate to a computing device when the user is perceivable by the computing device through some medium, capacity, and/or method (some examples include, but are not limited to, determining that the user's mobile device is connected to the computing device, determining that the user's mobile device is connected to the same network as the computing device, the user has touched the computing device, the user has moved in front of a camera of the computing device, a heat signature of the user has been identified by the computing device, the user has made a noise that is perceived by the computing device, the computing device stores a schedule of a when the user is near the computing device, the computing device uses artificial intelligence and/or machine learning to predict when the user is near the computing device, and/or any other method suitable for determining that the user is near the computing device). The user can then participate in the video communications as well and be given the option to add the contact and/or the guest to the user's contact list if the contact and/or the guest are not already on the user's contact list. In this way, a social network can be created by mimicking interpersonal communications using multiple computing devices discussed herein.

In some embodiments, a user of the computing device can record a video message using the video camera of the computing device and the video message can be automatically transferred to a contact's computing device when the contact (another user) is proximate to the contact's computing device. For example, the user can record a video message in the morning and designate, using the computing device, that video message for the contact in the contact list stored by the computing device. The user can also designate a time or period of time the video message is permitted to be transferred to the contact's computing device. Once the video message is recorded, the video message can be sent to the contact's computing device in response to the computing device receiving an indication from the contact's computing device that the contact is proximate to the contact's computing device. For example, if the contact was away from their home (where the contact's computing device is located) but returns in the evening, the contact will be greeted with a video message from the user once the contact's computing device determines that the contact is proximate to the contact's computing device. In other words, the contact's computing device will send the video message after the contact's computing device indicates, to the user's computing device, that the contact is perceivable by the contact's computing device in some capacity as discussed herein.

In some embodiments, a user can set a schedule of one or more times when the user is available for video communications. A period of availability can be called a free period, which is when the computing device will attempt to perceive the user in order to trigger a video chat session with a contact. A period of non-availability can be called a busy time, which is when the computing device is not attempting to perceive the user. However, in some embodiments, a sampling rate of a sensor that detects the user can be higher during the free period and can be higher than a sampling rate of the sensor during the busy period. Furthermore, the computing device can operate in a sleep mode during a busy period and operate in an on mode during an on period. A sleep mode can be a mode where at least one subsystem or portion of the computing device is not operating, or operating less relative to its operation during the on mode. In some embodiments, the computing device can attempt to perceive the user during the busy period but not send indications to other computing devices (i.e., contact computing devices). In this way, the user would be able to receive video messages that were previously recorded but not otherwise be bothered with potential video chat sessions. However, in some embodiments, the computing device can be notified of a contact's availability during the sleep mode. The user can then choose to have a video chat session with the contact even during the busy period. In this way, the user can break from their busy schedule in order to have a video chat session with a contact, even though the time is supposed to be a busy period where the user is not supposed to be bothered. In some embodiments, where multiple users engage the same computing device (e.g., in a multi-person household with a single computing device), each user can have different scheduled free periods and different scheduled busy periods. For example, one person in the household can designate to the computing device that they are free in the mornings while another person in the household can designate that they are busy in the mornings.

In some embodiments, the computing device can store a contact list that includes entries corresponding to contacts associated with a user of the computing device. The contacts can refer to other persons that have similar computing devices for performing video chat sessions with the user. Each contact can be associated with a status or tag that identifies the relationship of the contact to the user. In some embodiments, contacts can have separate permissions. For example, a first permission can be granted to contacts in order that video chat sessions can be established between the user and the contact without prompting or warning either the user or the contact. A second permission can be granted to contacts in order that video chat sessions can only be established once the user and the contact are perceived by their respective devices and they each acknowledge the start of the video chat session. The second permission can be reserved for acquaintances or persons that the user may not be entirely comfortable having a video chat session without a warning beforehand.

In some embodiments, a user can have computing device at their home residence and a portable computing device that also allows for video chat sessions as discussed herein. However, the computing device at the user's home residence can be shared by others that reside in the home residence. The home computing device can have multiple different contact lists that are associated with each person in the residence. When the user leaves the residence with their portable computing device, the contact list corresponding to the user can be temporarily inaccessible until the user returns to the home residence. As a result, anyone still at the home residence will be notified when a contact, in their respective contact list, is being perceived by their respective computing device. The home computing device can determine that the portable computing device is away from the home residence through notifications or signals that are sent from the portable computing device to the computing device, or to some other device that the computing device is connected to.

In some embodiments, the computing device can include a display panel that can operate in a split screen configuration. When multiple users are perceived by the computing device, and at least one contact per user is perceived by the contact's computing device, the computing device can operate in a split screen mode to allow the multiple users to talk to their contacts simultaneously. Additionally, if a first user is participating in a video chat session at the computing device with a first contact, and a second user approaches the computing device at the same time a second contact of the second user approaches the second contact's computing device, the video chat session can convert to a split screen. In this way, the video chat session with the first user can continue while also allowing another video chat session to occur between the second user and the second contact. The first user and the second user can decide to introduce the first contact and the second contact. An introduction can be performed by issuing a command to the computing device. The command can result in a prompt at the first contact's computing device and the second contact's computing device. If both the first contact and the second contact accept the introduction through the prompt, the first contact and the second contact will also have a split screen at their respective device such that a three-way video chat session is established between the first and second user's computing device, the first contact's computing device, and the second contact's computing device. The connection between the first contact's computing device and the second contact's computing device can end when the video chat session ends. Additionally, the first contact and the second contact can be prompted to add each other to their respective contact lists. In this way, the introduction would encourage the building of a social network between users and contacts.

In some embodiments, the computing device can include a transparent display panel. The transparent display panel can be arranged such that at least some amount of light can be transmitted through opposing surfaces of the display panel. For example, the computing device can be mounted in a window without completely obstructing a view of an area of the window covered by the display panel. Alternatively, the computing device can be mounted such that a user can optionally stand in front of one side of the transparent display panel or an opposing side of the transparent display panel, while still perceiving video output by the transparent display panel. The computing device can perceive the user and determine the side of the display panel that the user is facing and orient images on the display panel such that the images appear accurate no matter the side that the user is facing.

In yet other embodiments, the computing device can operate in multiple different privacy modes. For example, the user can create a schedule for the computing device that limits the computing device to transmitting audio to other computing devices, rather than video data, during a video chat session. Alternatively, the computing device can operate in a blurry mode where the video images that are transmitted to other computing devices during a video chat session are blurry. Blurry video images can be entirely blurry or blurry in all areas of the video images except for a user's face. In this way, contact computing devices will not be able to see the background of a user's video or identify other persons within the video. In other embodiments, a shower curtain effect can be applied to the video images and hide a portion of the video images that the user is concealing. For example, the user can see a video preview of themselves with an overlay or curtain that is at least partially transparent. The overlay can include a portion that does not conceal the user and is adjustable by motion of the user. In this way, the user is in control of how much another person can see in their video feed.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 illustrates steps for initiating a video chat session between a first user 112 and a second user 114. The video chat session can be performed by a first device 106 associated with the first user 112 and a second device 108 associated with the second user 114. The first computing device 106 can be placed in a first location 102, such as a residence of the first user 112, and the second computing device 108 can be placed in a second location 104, such as a residence of the second user 114. In some embodiments, each of the first computing device 106 and the second computing device 108 can be at least partially transparent, as indicated by wall corner 102A and wall corner 104A that are at least partially visible through the first computing device 106 and the second computing device 108. In other words, wall corner 102A is part of the first location 102 and wall corner 104A is part of the second location 104A.

FIG. 1 includes a first diagram 100 that illustrates the first computing device 106 in the first location 102 and the second computing device 108 in the second location 104. Each of the first computing device 106 and the second computing device 108 can be connected to a wireless network such as a local area network or cellular network. A signal strength of the network can be illustrated on the display of the first computing device 106 and the second computing device 108, as illustrated by icons 116. Each of the first computing device 106 and the second computing device 108 can attempt to perceive the first user 112 and the second user 114, respectively. Perceiving a user can be performed through one or more sensors, or other device for detecting a change in the environment of a computing device. For example, a sensor can include a camera for capturing images. The captured images can be used by the computing device to determine whether a user has moved in front of the computing device.

As illustrated in diagram 110 (each diagram 100, 110, and 120 is individually surrounded by dotted rectangle), the first user 112 and the second user 114 can simultaneously move proximate to their respective computing device. As a result, each of the first computing device 106 and the second computing device 108 can detect the first user 112 and the second user 114, respectively. The first computing device 106 can send a signal to the second computing device 108 indicating that the first user 112 has been perceived by the first computing device 106. The second computing device 108 can also send a signal to the first computing device 106 indicating that the second user 114 has been perceived by the second computing device 108. In some embodiments, when the first computing device 106 receives the signal from the second computing device 108, the first computing device 106 can display an indication 122, which indicates that the second user 114 has been perceived by the second computing device 108. Additionally, when the second computing device 108 receives the signal from the first computing device 106, the second computing device 108 can display an indication 124 indicating that the first user 112 has been perceived by the first computing device 106. If the first user 112 and the second user 114 are simultaneously perceived by their respective computing devices, a video communications channel can be created between the first computing device 106 and the second computing device 108.

Diagram 120 illustrates a video chat session occurring as a result of a video communications channel being created between the first computing device 106 and the second computing device 108. For example, it can be seen that the first user 112 is being depicted at the display of the first computing device 106 and the second user 114 is being depicted at the display of the first computing device 106. In this way, audio and video data can be exchanged between the first location 102 and the second location 104. The operations of the first computing device 106 and the second computing device 108 mimic inter-personal communications that would otherwise occur if the first user 112 and the second user 114 actually and physically walked by each other in the first location 102 or the second location 104. Such operations can be hands-free for all parties involved with respect to a device, thereby also mimicking in-person inter-personal communications.

Figure 2:
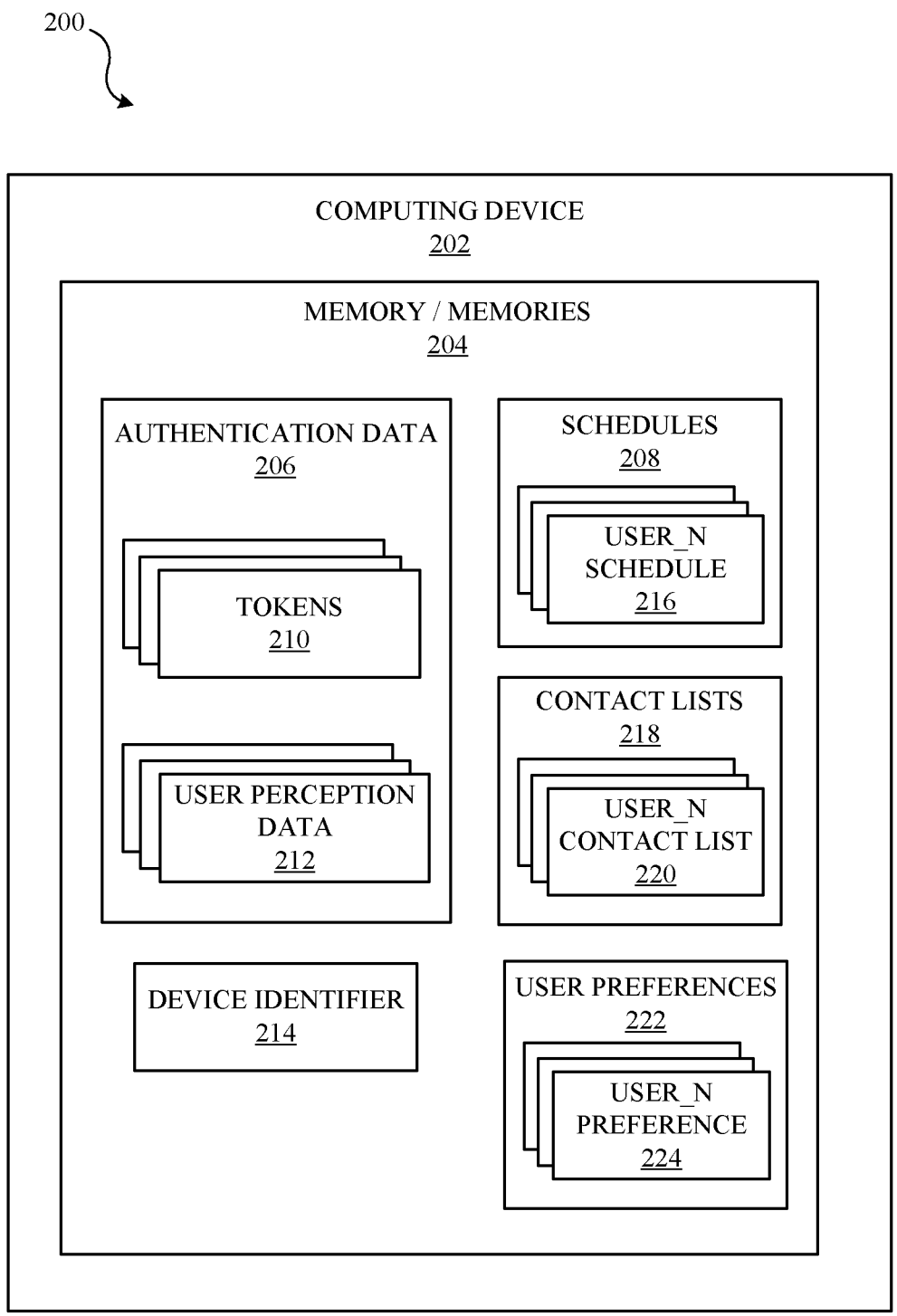
FIG. 2 illustrates data that can be stored by a computing device that participates in chat sessions, according to some embodiments.

FIG. 2 illustrates a computing device 202 having features that can be included in any of the computing devices discussed herein. It should be noted that many features of the computing device 202 are not shown in order to emphasize the features that can be useful for the systems, methods, and apparatus discussed herein. For example, the computing device 202 can include a memory 204 or memories 204 (i.e., one or more memory devices), in order to store information related to the operation of the computing device 202. The memories 204 can include one or more random access memories (RAMs) and/or one or more read only memories (ROMs). The computing device 202 can store authentication data 206, which can be used to create a secure connection with another computing device and/or authenticate a user of the computing device 202. The authentication data 206 can include tokens 210, which can be passed to a signaling server and/or another computing device in order to establish a communications channel between the computing device 202 and another computing device. The other computing device can also send a token to the signaling server and/or the computing device 202 in order to establish the connection. The authentication data 206 can also include user perception data 212. User perception data 212 can include data that is collected about a user during operation of the computing device 202. For example, user perception data 212 can include data related to the face of a user, the sound of a user's voice, the motion of a user, appearance of the user, the clothes of a user, the schedule of a user, and/or any other information suitable for identifying a user. The user perception data 212 can be used to accurately perceive a user. For example, data related to the sound of a user's voice can be used to distinguish the user from other persons in the location where the computing device 202 is located. User perception data 212 such as facial recognition data can also be used to distinguish the user from other persons in the location where the computing device is located. In some implementations, the communications channel can be connected between computing devices, prior to a video chat session being initialized, in order to reduce latency from attempts to establish the communications channel. For instance, the communications channel can being used by multiple computing devices 202 to exchange video data at a first bit rate, prior to users being present or perceived by the respective computing devices. However, the video data can be hidden until (e.g., each computing device can display an interface that conceals the video data and/or a display panel of the computing device can operate in a reduced power mode (reduced from or less than an amount of power that is consumed during a video chat session). When the users are present or otherwise perceived by the respective computing devices, the video data can be transmitted over the communications channel at a second bit rate that is higher than the first bit rate. Furthermore, each of the respective computing devices can cease concealing the video data and present that the video data as a video stream at each display panel of the respective computing devices when the users are present or otherwise perceived by the respective computing devices.

The memories 204 can also store a device identifier 214, which identifies the computing device 202. The device identifier 214 can be stored in a ROM of the memories 204. The device identifier 214 can be a value that is constant for the lifetime of the computing device 202 or a value that is programmable during the lifetime of the computing device 202. The device identifier 214 can be sent with the token 210 to a signaling server or another computing device in order to create a communications channel between the computing device 202 and another computing device. The tokens 210 can be unique for each user of the computing device 202 and the device identifier 214 can be the same for each user of the computing device 202. However, in some embodiments, both the tokens 210 and the device identifier 214 can be unique for each user of the computing device 202.

The memories 204 can also store schedules 208, which designate certain times when users are available to use the computing device 202. Each user of the computing device 202 can create a programmable schedule in order that they will not disturbed by the computing device 202 during certain times of the day. For example, user_N can create a user_N_schedule 216, which can define a part of the day where user_N is either available or not available for video communications with another user. The schedules 208 can also define times when the user does not want to be perceived by the computing device 202. This provides some amount of power savings for the computing device 202 because the one or more sensors responsible for perceiving the user would not be consuming power.

The memories 204 can also include contact lists 219, which can include one or more user_N contact lists 220. Each user of the computing device 202 can be associated with a different user_N contact list 220. In some embodiments, multiple users can be associated with a single user_N contact list 220. When the computing device 202 perceives a user, the computing device 202 can identify a contact list that is associated with the user. Once the contact list is identified in the contact lists 218, the computing device 202 can determine whether the computing device 202 has received any indications that other users on the identified contact list has been perceived by their respective computing device. If another user corresponds to an entry in the identified contact list and is has also been simultaneously perceived by their computing device when the user is being perceived by the computing device 202, the computing device 202 can assist in creating a communications channel between the user and the other user. One or more entries on a user_N contact list 220 can include designations for the entries. The designations can define a level of privacy for the user with respect to the contact in the contact list. For example, a designation can be one or more of multiple designations that include: spouse, family, friend, acquaintance, co-worker, and/or any other designation that can characterize a relationship between two persons.

The memories 204 can also user preferences 222, and each user associated with the computing device 202 can setup a user_N preference 224 that is programmable over the lifetime of the computing device 202. The user preferences 222 can include configuration data for operating the computing device 202 according the user that is operating the computing device 202 and/or the other user that may be communication to the user through a communications channel. For example, in some embodiments, a lowest amount of privacy can be assigned to contacts in a contact list that have been designated as a spouse. For the lowest amount of privacy, a video chat session between the user and the spouse contact can be initiated without prompting or warning the user before the video chat session begins. In other words, when the user and the spouse contact are simultaneously perceived by their respective computing device, a video chat session between their respective computing devices can be automatically created without prompt. Additionally, the lowest amount of privacy can include a preference for not requiring as much user perception data relative to other privacy settings. In this way, a video communications channel can be created between computing devices without individually identifying each user, but rather only identifying that a person is being perceived by each computing device.

Furthermore, in some embodiments, a higher amount of privacy, relative to the lowest, can be assigned to contacts in a contact list that have been designated as friends. When a contact is designated as a friend, the computing device 202 can identify the identity of a user, rather than merely identifying the user as being a person. In this way, when the computing device 202 receives an indication that the first contact has been perceived by their respective computing device, the computing device 202 will only participate a video chat session with the friend contact if the user is identified. In other words, because the friend contact is identified in a contact list of the user, the computing device 202 can be programmed to perceive a person and identify the person as the user before participating in a video chat session with the friend contact.

In some embodiments, a contact can be designated as an acquaintance, which can be a designation that corresponds to higher amount of privacy than a friend designation. A user preference corresponding to the acquaintance designation can direct the computing device 202 to not only identify the identity of a user before participating in a video chat session, but also alter or limit the data that is sent during the video chat session. For example, a video chat session with an acquaintance contact can include video data that is altered to limit what can be seen in the video data (e.g., blurring the entire video transmission from the user, blurring only the background of the video transmission from the user but not blurring the user's person, not sending video data, and/or any other modification suitable for securing some amount of privacy for a user). In some embodiments, a user preference corresponding to the acquaintance designation can direct the computing device 202 to ask the user to confirm the initiation of a video chat session before the video chat session with an acquaintance contact can begin. Furthermore, a user preference corresponding to the acquaintance designation can direct the computing device 202 to give the user an amount of time before initiating a video chat session with an acquaintance contact. Additionally, the user preference corresponding to the acquaintance designation can direct the computing device 202 to give the user an option to decline the video chat session with the acquaintance contact after being notified the user and acquaintance contact are simultaneously being perceive by their respective computing devices.

Figure 3:
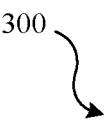
FIG. 3 illustrates a user privacy preferences table that can be employed by any of the embodiments discussed herein.

FIG. 3 illustrates a table 300 of user privacy preferences 302 that can be employed by any of the embodiments discussed herein. It should be noted that any of the embodiments can use more or less privacy levels than those provided in table 300. Table 300 provides three privacy levels: low (e.g., for spouses communicating over a communications channel), medium (e.g., for friends and/or family communicating over a communications channel), and high (e.g., for acquaintances communicating over a communications channel). The "user side" refers to the perspective of a user who is using a computing device that participates in chat sessions and the "contact side" refers to the perspective of a contact of the user. A contact refers to a person that the user has identified in an entry of a contact list stored by user's computing device. A contact with a "low" privacy designation can participate in a low privacy level video chat session with the user. The low privacy level video chat session means no warning will be provided before the video chat session and the user's computing device will not attempt to verify the identity of the user before participating in the video chat session. The low privacy level is good for spouses that are more comfortable chatting with their spouse without warning and would not worry about their spouse contact seeing other people in the video chat session such as children or other friends.

A contact with a medium privacy designation can participate in a medium privacy level video chat session with the user. The medium privacy level video chat session means no warning will be provided before the video chat session and the user's computing device will attempt to verify the identity of the user before participating in the video chat session. The medium privacy level is good for friends that are comfortable chatting without warning and have some concern about the contact accidentally chatting with other person's in the user's household. For example, the user might live with other persons who also chat on the computing device and have a separate contact list. In order to avoid the other persons chatting with the user's friends, the computing device can verify the user's identity before participating in a video chat session with the user's friend (i.e., a medium privacy level contact). A contact with a high privacy designation can participate in a high privacy level chat session with the user. The high privacy level chat session means content of the data stream to high privacy designated contact can be at least partially blocked. For example, if the user is participating in a chat session with a high privacy designated contact, the data stream from the user's computing device to the contact's computing device can include a blurry video stream or no video stream (just audio). Alternatively, the data stream can include a blurry background video stream where the contact is able to see the user's face and/or body with a blurry background. Additionally, the user's identify must be identified before the user's computing device can participate in a video chat session with a high privacy level contact. Additionally, the user can be given a warning and an option to decline participating in the chat session with a high privacy level contact. Furthermore, at the contact side of the high privacy level contact, the contact will be given the option to decline participating in the chat session and the contact's view of the data stream from the user's computing device can be at least partially blocked. The user privacy preferences 302 can be stored by a user's computing device and be accessed in response to the user's computing device receiving an indication that a contact is being perceived by the contact's computing device. The user's computing device can that configure itself according to the privacy level that the user has assigned to the contact that is being perceived by the contact's computing device.

Figure 4:
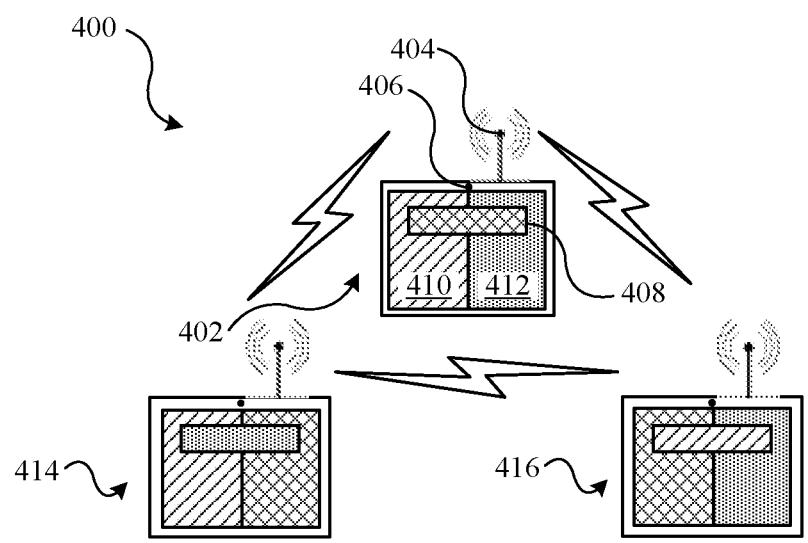
FIG. 4 illustrates a diagram for providing a peer to peer connection between computing devices for conducting a chat session between the computing devices, according to some embodiments.

FIG. 4 illustrates a diagram 400 of computing devices that are connected as a peer to peer network for conducting a video chat session. The diagram 400 includes a first computing device 402, a second computing device 414, and a third computing device 416. The first computing device 402 can include an antenna 404 that is connected to a network interface of the first computing device 402. The first computing device 402 can communicate with the second computing device 414 and the third computing device 416 using the network interface and the antenna 404. The antenna 404 can be used to send a device identifier and/or token(s) to the second computing device 414 and the third computing device 416. The device identifier and/or token(s) can be used by other computing devices in order to verify the authenticity of the first computing device 402 and establish a communications channel with the first computing device 402. The first computing device 402 can also include a camera 406. The camera 406 can be used to perceive a user at the first computing device 402 and/or collect video data for transmission during a video chat session. Additionally, the camera 406 can be programmed to periodically capture image data of the environment of the first computing device 402 in order to determine whether a user is near the first computing device 402.

During a video chat session, the first computing device 402 can display a preview 408 of the video data that is being transmitted from the first computing device 402 to the second computing device 414 and the third computing device 416. When the first computing device 402 is participating in a chat session with only the second computing device 414, the first computing device 402 can display the preview 408 and a first video data stream 410 received from the second computing device 414. When the first computing device 402 is participating in a chat session with the second computing device 414 and the third computing device 416, the first computing device 402 can display the preview 408, the first video data stream 410 corresponding to video data received from the second computing device 414, and a second video stream 412 corresponding to video data received from the third computing device 416. In some implementations, prior to conducting a video chat session between users, the first computing device 402 and the second computing device 414 can be exchanging video data through a peer to peer connection. However, a display panel (e.g., a touch screen display) or user interface of each of the first computing device 402 and the second computing device 414 can be hide the video data (e.g., by not presented the video data or otherwise blocking the video data from being displayed at each display panel). In response to a user being perceived by each of the first computing device 402 and the second computing device 414 respectively, the first computing device 402 and the second computing device 414 can cease blocking the video data from being displayed. In this way, latency from having to establish a connection for sharing video data can be avoided as there will always be some amount of video data being shared between devices— the video data will just not be displayed until motion is simultaneously perceived by computing devices. In some implementations, the video data shared between the first computing device 402 and the second computing device 414 can be provided at a first bit rate, prior to users being simultaneously perceived by respective computing devices. Furthermore, the video data being shared can be hiding from each display panel of the respective computing devices prior to the users being simultaneously perceived by the respective computing devices. In response to each user being perceived at each respective computing device (the first computing device 402 and the second computing device 414), a second bit rate, which is higher than the first bit rate, can be employed for sending video data between the respective devices. It should be noted that this method of hiding video data and modifying bit rates can be employed in any of the embodiments discussed herein, including embodiments that operate in, or not in, a peer or peer architecture.

Figure 5:
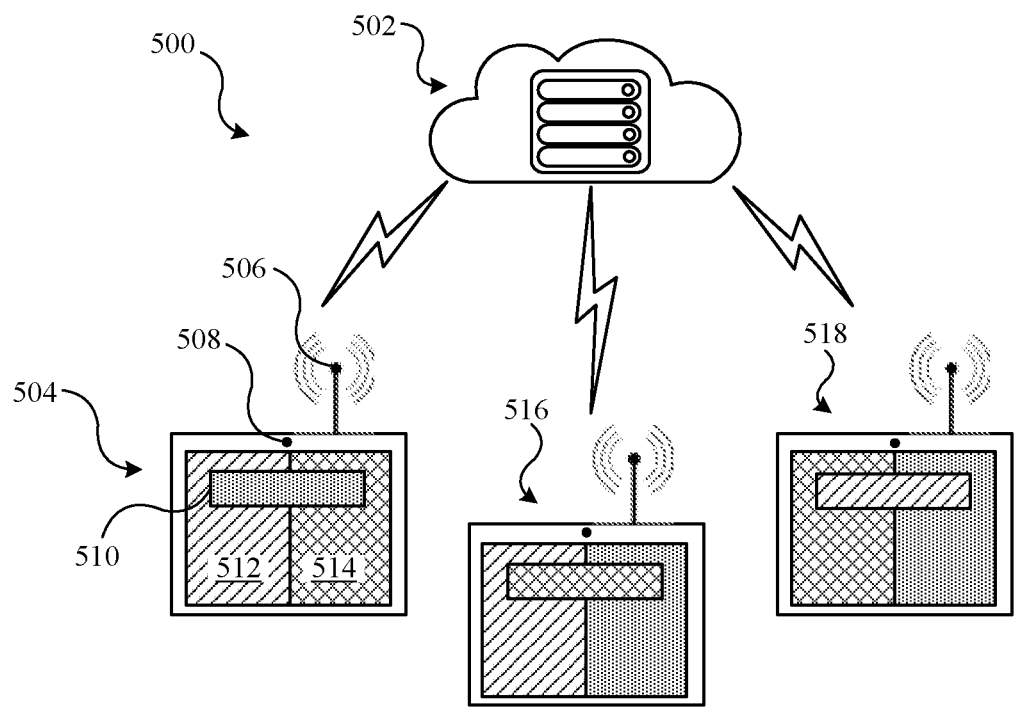
FIG. 5 illustrates a connection between computing devices using a server to conduct a chat session between the computing devices, according to some embodiments.

FIG. 5 illustrates a diagram 500 of computing devices that are connected as a network for conducting a video chat session using a server 502. The diagram 500 includes a first computing device 504, a second computing device 516, and a third computing device 518. The first computing device 504 can include an antenna 506 that is connected to a network interface of the first computing device 504. The first computing device 504 can communicate with the server 502, and/or the second computing device 516 and the third computing device 518 using the network interface and the antenna 404. The antenna 506 can be used to send a device identifier and/or token(s) to the server 502, and/or the second computing device 516 and the third computing device 518. The device identifier and/or token(s) can be used by the server 502, and/or the second computing device 516 and the third computing device 518 in order to verify the authenticity of the first computing device 402 and establish a communications channel with the first computing device 504. The first computing device 504 can also include a camera 508. The camera 508 can be used to perceive a user at the first computing device 504 and/or collect video data for transmission during a video chat session. Additionally, the camera 508 can be programmed to periodically capture image data of the environment of the first computing device 504 in order to determine whether a user is near the first computing device 504. During a video chat session, the first computing device 504 can display a preview 510 of the video data that is being transmitted from the first computing device 504 to the second computing device 516 and the third computing device 518. When the first computing device 504 is participating in a chat session with only the second computing device 516, the first computing device 504 can display the preview 510 and a first video data stream 514 received from the second computing device 516. When the first computing device 504 is participating in a chat session with the second computing device 516 and the third computing device 518, the first computing device 504 can display the preview 510, the first video data stream 514 corresponding to video data received from the second computing device 516, and a second video stream 512 corresponding to video data received from the third computing device 518. This can be referred to as a split screen where multiple video streams are display simultaneously at a single display panel of a computing device.

Figure 6:
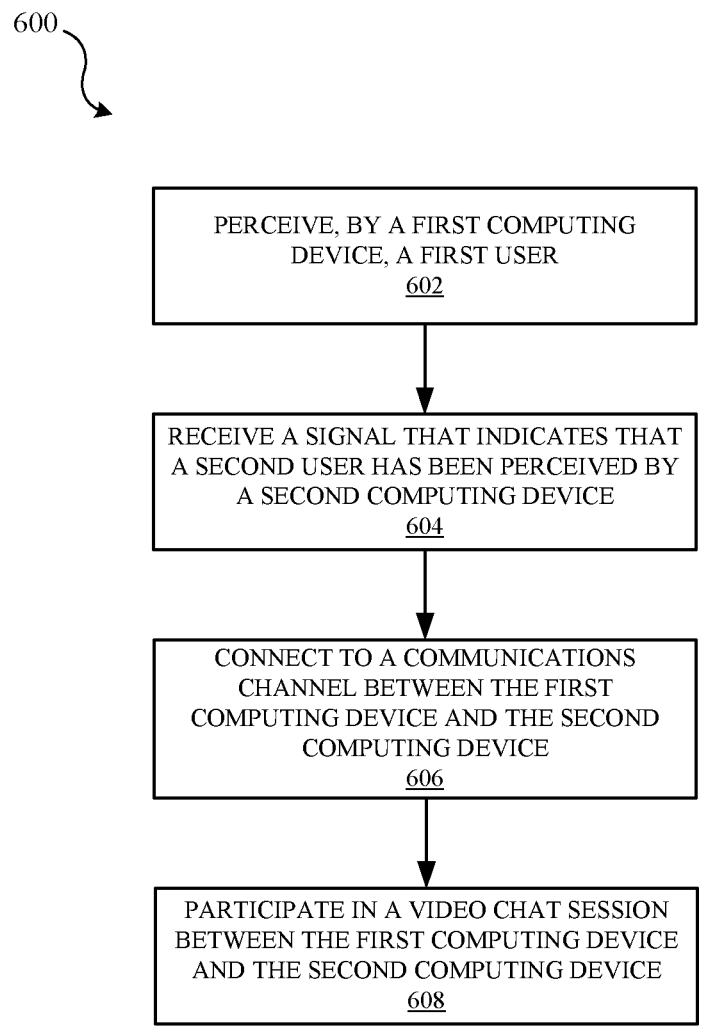
FIG. 6 illustrates a method for creating a video chat session between at least two computing devices, according to some embodiments, according to some embodiments.

FIG. 6 illustrates a method 600 for creating a video chat session between at least two computing devices, according to some embodiments. As shown, the method 600 begins at step 602, where a first computing device perceives a first user. At step 604, the first computing device receives a signal that indicates that a second user has been perceived by a second computing device. At step 606, the first computing device helps to establish a communications channel between the first computing device and the second computing device. At step 608, the first computing participates in a video chat session between the first computing device and the second computing device. In some embodiments, step 602 and step 604 must occur within a threshold period of time before the method can proceed to step 606. The threshold period of time can be set by one or both of the first computing device and the second computing device, or a signaling server that is communicatively coupled to the first computing device and the second computing device. Additionally, the method 600 can include an optional step of, in response to the first computing device perceiving the first user, the first computing device sending a signal to indicate that the first computing device has perceived the first user. The signal from the first computing device can be sent to the signaling server and/or the second computing device.

Figure 7:
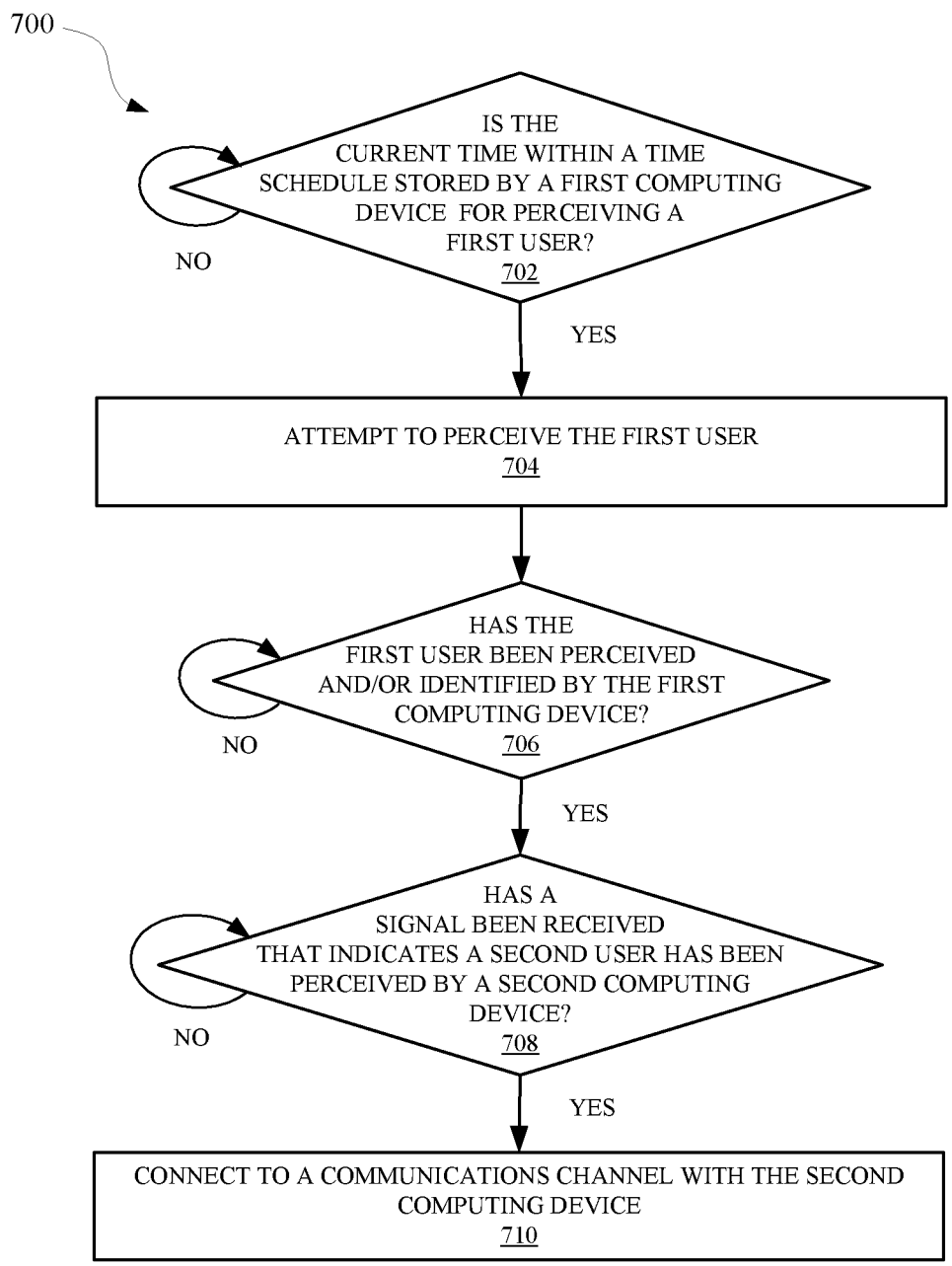
FIG. 7 illustrates a method for connecting a first computing device and a second computing device, according to some embodiments.

FIG. 7 illustrates a method 700 for connecting a first computing device and a second computing device, according to some embodiments. As shown, the method 700 begins at step 702, where the first computing device determines whether a current time is within a time schedule stored by the first computing device for perceiving a first user. If the current time is not within a time schedule for perceiving the first user, time will continue until the current time is within the stored time schedule. If the current time is within the time schedule for perceiving the first user, then, at step 704, the first computing device attempts to perceive the first user.

At step 706, the first computing device determines whether has the first user been perceived and/or identified by the first computing device. If, at step 706, the first computing device determines the first user has been perceived and/or identified by the first computing device, then the method 700 proceeds to step 708. Otherwise, the first computing device will continue to attempt to perceive the first user.

At step 708, the first computing device determines whether a signal been received that indicates a second user has been perceived by a second computing device. If, at step 708, the first computing device determines that a signal has been received that indicates a second user has been perceived by a second computing device, then the method 700 proceeds to step 710. Otherwise, the method 700 will not proceed to step 710 until the signal is received. Furthermore, method 700 can return to step 702 when the current time is no longer within a time scheduled for perceiving the first user. Additionally, the method 700 can return to step 704 when the first user is no longer perceived by the first computing device. At step 710, the first computing device can connect to a communications channel with the second computing device. The communications channel can refer to a pier to pier connection between the first computing device and the second computing device. The communications channel can also refer to a connection to a server that is also connected to the second computing device.

Figure 8:
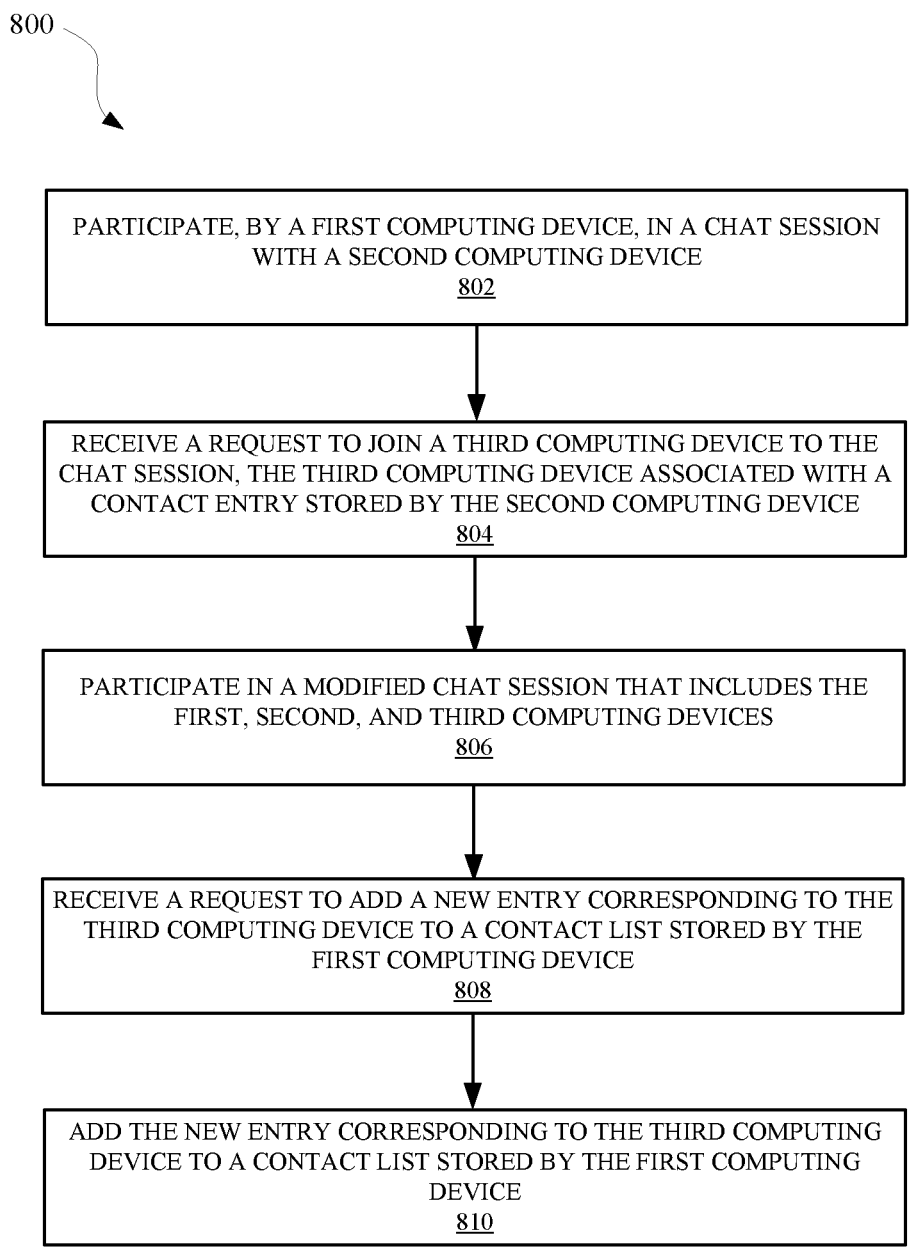
FIG. 8 illustrates a method for meeting a new contact through a three-way chat session and amending a contact list to include the new contact, according to some embodiments.

FIG. 8 illustrates a method 800 for meeting a new contact through a three-way chat session and amending a contact list to include the new contact, according to some embodiments. As shown, the method 800 begins at step 802, where the first computing device participates in a chat session with a second computing device. At step 804, the first computing device receives a request to join a third computing device to the chat session. The third computing device can be associated with a contact entry stored by the second computing device. At step 806, the first computing device participates in a modified chat session that includes the first computing device, the second computing device, and the third computing device. At step 808, the first computing device receives a request to add a new entry corresponding to the third computing device to a contact list stored by the first computing device. At step 810, the first computing device adds the new entry corresponding to the third computing device to a contact list stored by the first computing device.

Figure 9:
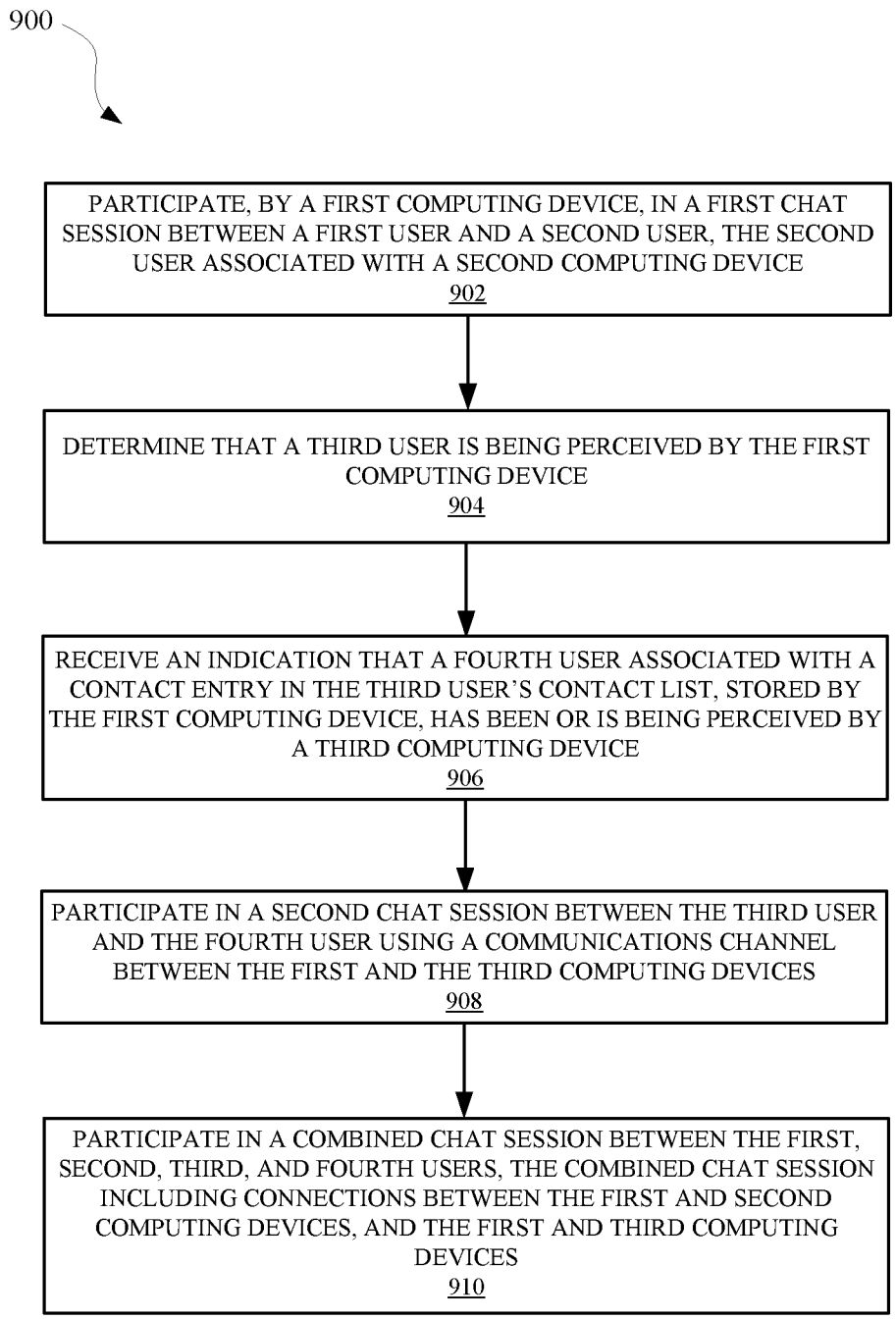
FIG. 9 illustrates a method for participating in a combined chat session between three or more computing devices, according to some embodiments.

FIG. 9 illustrates a method 900 for participating in a combined chat session between three or more computing devices, according to some embodiments. As shown, the method 900 begins at step 902, where the first computing device participates in a first chat session between a first user and a second user, the second user associated with a second computing device. At step 904, the first computing device determines that a third user is being perceived by the first computing device. At step 906, the first computing device receives an indication that a fourth user associated with a contact entry in the third user's contact list, stored by the first computing device, has been or is being perceived by a third computing device. At step 908, the first computing device participates in a second chat session between the third user and the fourth user using a communications channel between the first and the third computing devices. For example, when the first chat session and the second chat sessions are video chat sessions, the display panel of the first computing device can show a split screen. One portion of the split screen can show a first video feed from the second computing device and another portion of the split screen can show a second video feed from the third computing device. At step 910, the first computing device participates in a combined chat session between the first user, the second user, the third user, and the fourth user. The combined chat session can include connections between the first computing device and second computing device, and the first computing device and the third computing device. It should be noted that one or more of the "participate" steps (e.g., 902, 908, and 910) of method 900 can be preceded by a step of receiving and/or sending a request at the first computing device and/or accepting a request at the first computing device, where each request and/or acceptance is associated with performing the proceeding "participate" step. For example, the first computing device can send a request to the third computing device and/or the second computing device to participate in the combined chat session.

Figure 10:
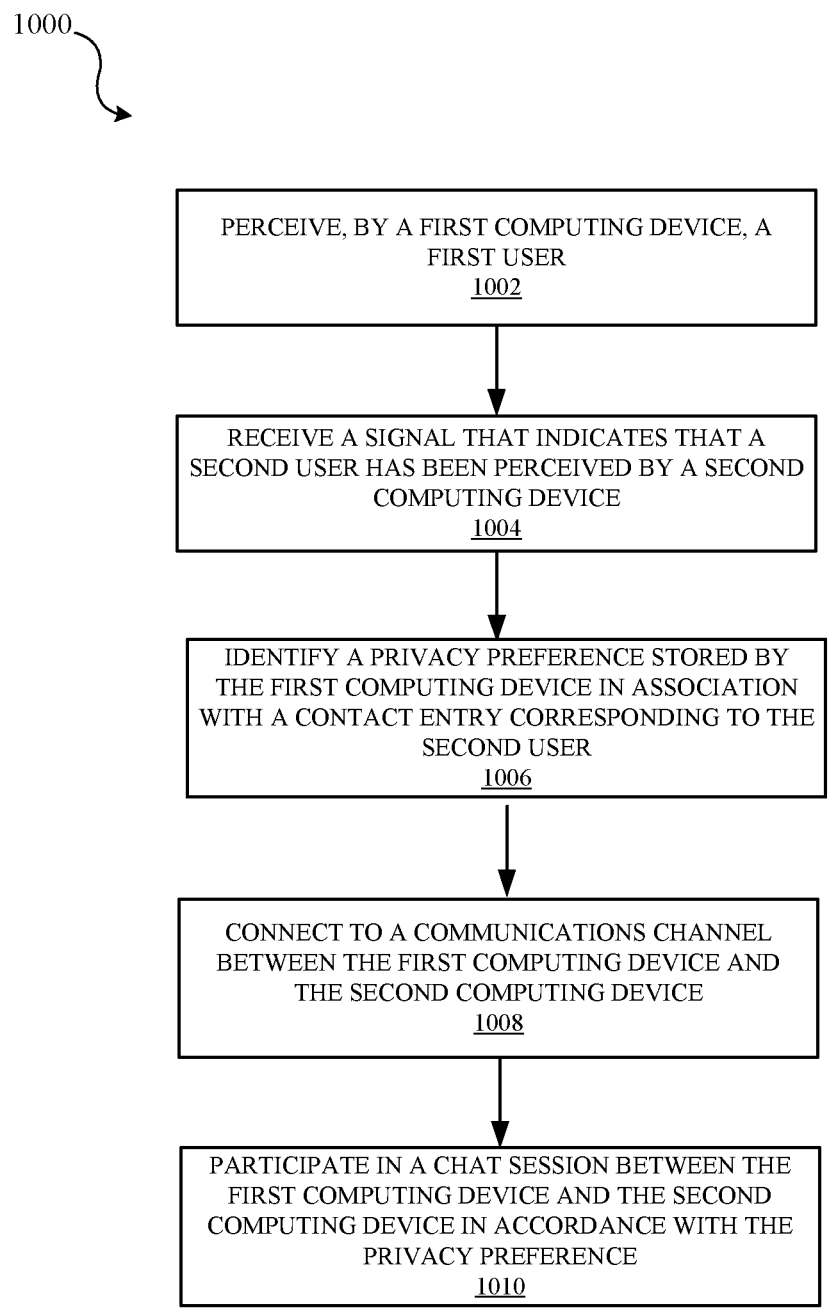
FIG. 10 illustrates a method for participating in a chat session based on a privacy preference associated with a contact user participating in the chat session, according to some embodiments.

FIG. 10 illustrates a method 1000 for participating in a chat session based on a privacy preference associated with a contact user participating in the chat session, according to some embodiments. As shown, the method 10 begins at step 1002, where the first computing device perceives a first user. At step 1004, the first computing device receives a signal that indicates that a second user has been perceived by a second computing device. At step 1006, the first computing device identifies a privacy preference stored by the first computing device in association with a contact entry corresponding to the second user. At step 1008, the first computing device connects to a communications channel between the first computing device and the second computing device. At step 1010, the first computing device participates in a chat session between the first computing device and the second computing device in accordance with the privacy preference. For example, the privacy preference can include any of the privacy preferences or privacy settings discussed herein. The privacy preference can include any type of privacy setting suitable for protecting a user's privacy during a chat session between two or more computing devices.

Figure 11:
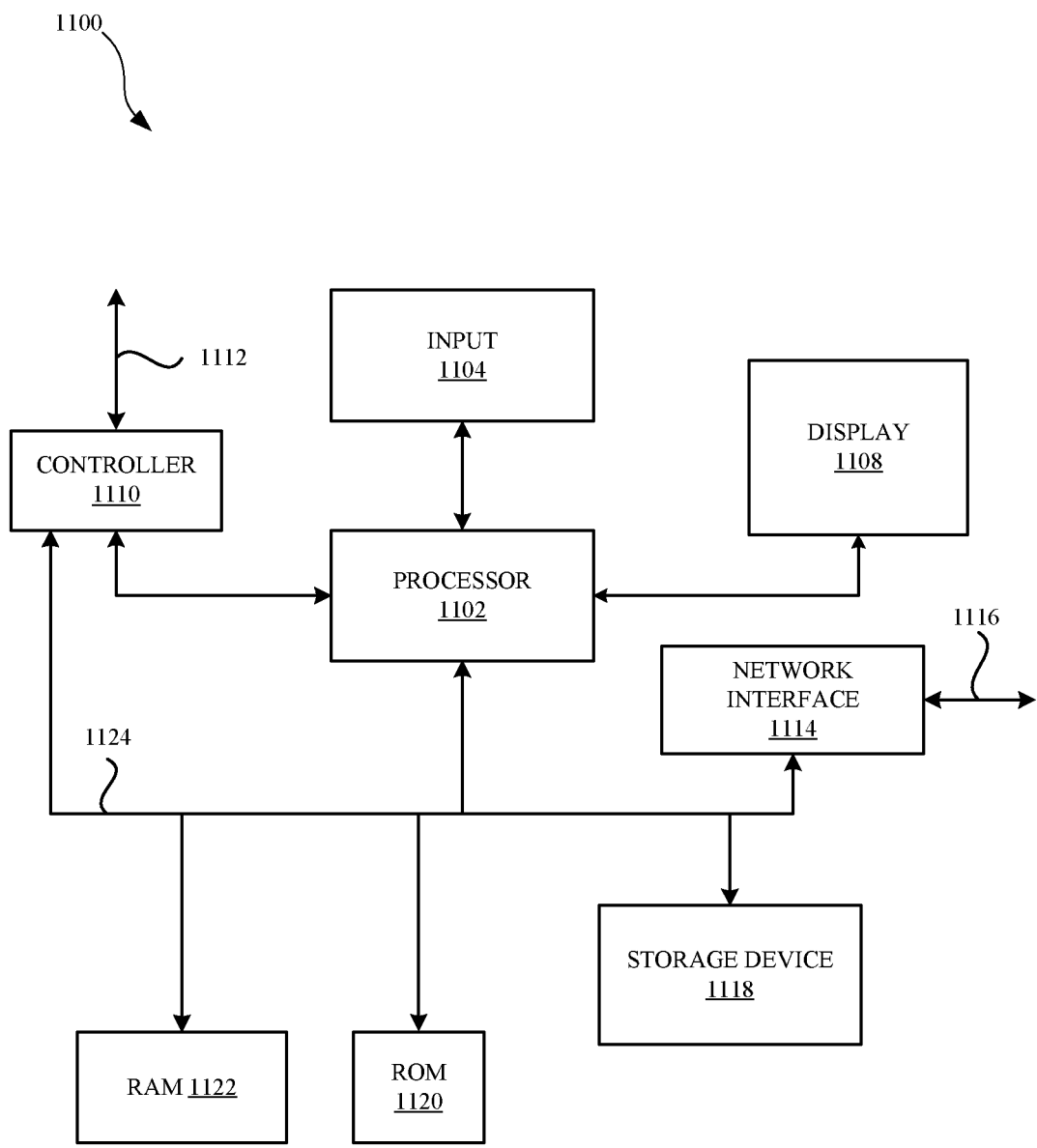
FIG. 11 is a block diagram of a computing device that can represent the components of the computing device, apparatus, mobile device, or any of the devices or apparatus discussed herein.

FIG. 11 is a block diagram of a computing device 1100 that can represent the components of the computing device, apparatus, mobile device, or any of the devices or apparatus discussed herein. It will be appreciated that the components, devices or elements illustrated in and described with respect to FIG. 11 may not be mandatory and thus some may be omitted in certain embodiments. The computing device 1100 can include a processor 1102 that represents a microprocessor, a coprocessor, circuitry and/or a controller for controlling the overall operation of computing device 1100. Although illustrated as a single processor, it can be appreciated that the processor 1102 can include a plurality of processors. The plurality of processors can be in operative communication with each other and can be collectively configured to perform one or more functionalities of the computing device 1100 as described herein. In some embodiments, the processor 1102 can be configured to execute instructions that can be stored at the computing device 1100 and/or that can be otherwise accessible to the processor 1102. As such, whether configured by hardware or by a combination of hardware and software, the processor 1102 can be capable of performing operations and actions in accordance with embodiments described herein.

The computing device 1100 can also include user input device 1104 that allows a user of the computing device 1100 to interact with the computing device 1100. For example, user input device 1104 can take a variety of forms, such as a button, keypad, dial, touch screen, audio input interface, visual/image capture input interface, input in the form of sensor data, etc. Still further, the computing device 1100 can include a display 1108 (screen display) that can be controlled by processor 1102 to display information to a user. Controller 1110 can be used to interface with and control different equipment through equipment control bus 1112. The computing device 1100 can also include a network/bus interface 1114 that couples to data link 1116. Data link 1116 can allow the computing device 1100 to couple to a host computer or to accessory devices. The data link 1116 can be provided over a wired connection or a wireless connection. In the case of a wireless connection, network/bus interface 1114 can include a wireless transceiver.

The computing device 1100 can also include a storage device 1118, which can have a single disk or a plurality of disks (e.g., hard drives) and a storage management module that manages one or more partitions (also referred to herein as "logical volumes") within the storage device 1118. In some embodiments, the storage device 1118 can include flash memory, semiconductor (solid state) memory or the like. Still further, the computing device 1100 can include Read-Only Memory (ROM) 1120 and Random Access Memory (RAM) 1122. The ROM 1120 can store programs, code, instructions, utilities or processes to be executed in a non-volatile manner. The RAM 1122 can provide volatile data storage, and store instructions related to components of the storage management module that are configured to carry out the various techniques described herein. The computing device 1100 can further include data bus 1124. Data bus 1124 can facilitate data and signal transfer between at least processor 1102, controller 1110, network interface 1114, storage device 1118, ROM 1120, and RAM 1122.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method implemented by one or more processors, the method comprising:
   determining that a first user has been detected by a sensor connected to a first computing device;
   determining, while the first user is being detected by the sensor, that a second user has been detected by another sensor connected to a second computing device;
   generating, in response to determining that the first user is being detected by the sensor while the second user is being detected by the other sensor, authentication data, wherein the authentication data is generated in furtherance of establishing a communication channel between the first computing device and the second computing device;
   providing the authentication data to a server in furtherance of establishing the communication channel between the first computing device and the second computing device; and
   causing the server to establish the communication channel between the first computing device and the second computing device,
      wherein the server establishes the communication channel based on receiving at least the authentication data, and
      wherein the first computing device and the second computing device communicate via the communication channel simultaneous to the sensor detecting the first user and the other sensor detecting the second user.

2. The method of claim 1, wherein determining that the first user has been detected by the sensor connected to the first computing device includes:
   determining that a face of the first user has been detected by the first computing device using the sensor connected to the first computing device.

3. The method of claim 1, wherein causing the first computing device to communicate with the second computing device via the communication channel includes:
   causing a display device of the first computing device to transition from a sleep mode to an on mode.

4. The method of claim 1, further comprising:
   accessing, in response to determining that the first user has been detected by the sensor connected to the first computing device, schedule data,
      wherein the schedule data defines a period of time when the first computing device is configured to communicate with the second computing device.

5. The method of claim 1, further comprising:
   storing an editable contact list that is configured to include entries that identify the second computing device and a third computing device.

6. The method of claim 5, further comprising:
   receiving an indication that a third sensor of the third computing device has detected an environmental change; and
   causing another communications channel to be created between the first computing device and the third computing device,
      wherein the first computing device simultaneously shares video data with the second computing device and the third computing device.

7. The method of claim 1, further comprising:
   receiving, from the first computing device, a request to add an entry to a contact list associated with the first computing device,
      wherein the entry corresponds to a contact name stored by the second computing device.

8. A non-transitory computer readable storage medium configured to store instructions that, when executed by one or more processors included in a computing device, cause the computing device to perform operations that include:
   determining that a first user has been detected by a sensor connected to a first computing device;

determining, while the first user is being detected by the sensor, that a second user has been detected by another sensor connected to a second computing device;

generating, in response to determining that the first user is being detected by the sensor while the second user is being detected by the other sensor, authentication data, wherein the authentication data is generated in furtherance of establishing a communication channel between the first computing device and the second computing device;

providing the authentication data to a server in furtherance of establishing the communication channel between the first computing device and the second computing device; and causing the server to establish the communication channel between the first computing device and the second computing device,
wherein the server establishes the communication channel based on receiving at least the authentication data, and
wherein the first computing device and the second computing device communicate via the communication channel simultaneous to the sensor detecting the first user and the other sensor detecting the second user.

9. The non-transitory computer readable storage medium of claim 8,
wherein determining that the first user has been detected by the sensor connected to the first computing device includes:
determining that a face of the first user has been detected by the first computing device using the sensor connected to the first computing device.

10. The non-transitory computer readable storage medium of claim 8,
wherein causing the first computing device to communicate with the second computing device via the communication channel includes:
causing a display device of the first computing device to transition from a sleep mode to an on mode.

11. The non-transitory computer readable storage medium of claim 8, wherein the operations further include:
accessing, in response to determining that the first user has been detected by the sensor connected to the first computing device, schedule data,
wherein the schedule data defines a period of time when the first computing device is configured to communicate with the second computing device.

12. The non-transitory computer readable storage medium of claim 8,
wherein the operations further include:
storing an editable contact list that is configured to include entries that identify the second computing device and a third computing device.

13. The non-transitory computer readable storage medium of claim 12,
wherein the operations further include:
receiving an indication that a third sensor of the third computing device has detected an environmental change; and
causing another communications channel to be created between the first computing device and the third computing device,
wherein the first computing device simultaneously shares video data with the second computing device and the third computing device.

14. The non-transitory computer readable storage medium of claim 8,
wherein the operations further include:
receiving, from the first computing device, a request to add an entry to a contact list associated with the first computing device,
wherein the entry corresponds to a contact name stored by the second computing device.

15. A computing device, comprising:
one or more processors; and
memory storing instructions that, when executed by the one or more processors, cause the one or more processors to perform operations that include:
determining that a first user has been detected by a sensor connected to a first computing device;
determining, while the first user is being detected by the sensor, that a second user has been detected by another sensor connected to a second computing device;
generating, in response to determining that the first user is being detected by the sensor while the second user is being detected by the other sensor, authentication data, wherein the authentication data is generated in furtherance of establishing a communication channel between the first computing device and the second computing device;
providing the authentication data to a server in furtherance of establishing the communication channel between the first computing device and the second computing device; and
causing the server to establish the communication channel between the first computing device and the second computing device,
wherein the server establishes the communication channel based on receiving at least the authentication data, and
wherein the first computing device and the second computing device communicate via the communication channel simultaneous to the sensor detecting the first user and the other sensor detecting the second user.

16. The computing device of claim 15, wherein determining that the first user has been detected by the sensor connected to the first computing device includes:
determining that a face of the first user has been detected by the first computing device using the sensor connected to the first computing device.

17. The computing device of claim 15, wherein causing the first computing device to communicate with the second computing device via the communication channel includes:
causing a display device of the first computing device to transition from a sleep mode to an on mode.

18. The computing device of claim 15, wherein the operations further include:
accessing, in response to determining that the first user has been detected by the sensor connected to the first computing device, schedule data,
wherein the schedule data defines a period of time when the first computing device is configured to communicate with the second computing device.

19. The computing device of claim 15, wherein the operations further include:
storing an editable contact list that is configured to include entries that identify the second computing device and a third computing device.

20. The computing device of claim 19, wherein the operations further include:

receiving an indication that a third sensor of the third computing device has detected an environmental change; and causing another communications channel to be created between the first computing device and the third computing device, wherein the first computing device simultaneously shares video data with the second computing device and the third computing device.

\* \* \* \* \*

UNITED STATES PATENT AND TRADEMARK OFFICE
CERTIFICATE OF CORRECTION

| | |
|---|---|
| PATENT NO. | : 10,856,043 B2 |
| APPLICATION NO. | : 16/517717 |
| DATED | : December 1, 2020 |
| INVENTOR(S) | : Patrick Dean Cummins |

It is certified that error appears in the above-identified patent and that said Letters Patent is hereby corrected as shown below:

On the Title Page

Item (12), should read: Cummins
Item (72), should read: Patrick Dean Cummins, Louisville, KY (US)

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*